United States Patent
Wu et al.

(10) Patent No.: US 11,775,201 B2
(45) Date of Patent: Oct. 3, 2023

(54) APPARATUS AND METHOD FOR PROVIDING ONE TIME PROGRAMMABLE MEMORY FEATURES IN A HYPERVISOR OF A COMPUTING DEVICE

(71) Applicant: Huawei Technologies Co., Ltd., Shenzhen (CN)

(72) Inventors: Liming Wu, Bonn (DE); Kui Wang, Helsinki (FI); Rémi Robert Michel Denis-Courmont, Helsinki (FI); Igor Stoppa, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 247 days.

(21) Appl. No.: 17/266,901

(22) PCT Filed: Aug. 8, 2018

(86) PCT No.: PCT/EP2018/071554
§ 371 (c)(1),
(2) Date: Feb. 8, 2021

(87) PCT Pub. No.: WO2020/030268
PCT Pub. Date: Feb. 13, 2020

(65) Prior Publication Data
US 2021/0342092 A1    Nov. 4, 2021

(51) Int. Cl.
*G06F 12/00* (2006.01)
*G06F 3/06* (2006.01)
(Continued)

(52) U.S. Cl.
CPC .......... *G06F 3/0655* (2013.01); *G06F 3/0604* (2013.01); *G06F 3/064* (2013.01);
(Continued)

(58) Field of Classification Search
CPC .... G06F 3/0622; G06F 3/0631; G06F 3/0632; G06F 3/064; G06F 3/0688; G06F 3/0619; G06F 3/0644; G06F 3/0679; G06F 12/02
See application file for complete search history.

(56) References Cited

U.S. PATENT DOCUMENTS 10,002,084 B1 *  6/2018 Warkentin .......... G06F 12/1009
10,459,851 B2 * 10/2019 Krten ................. G06F 21/6218
(Continued)

FOREIGN PATENT DOCUMENTS

WO    2004084231 A1    9/2004

*Primary Examiner* — John A Lane
(74) *Attorney, Agent, or Firm* — Leydig, Voit & Mayer, Ltd.

(57) ABSTRACT

An apparatus that includes a processor and a memory. The processor and the memory are configured to provide a first software process configured to execute at a first privilege level; and a second software process configured to execute at a second privilege level, wherein the first privilege level is more restrictive than the second privilege level. The processor is configured to, initialize, at the first privilege level, a memory pool within the memory, allocate, at the first privilege level, a block of memory, send a request to write protect the block of memory to the second software process, and to write protect, at the second privilege level, the allocated block of memory.

18 Claims, 2 Drawing Sheets

(51) Int. Cl.
*G06F 9/455* (2018.01)
*G06F 21/53* (2013.01)
*G06F 12/14* (2006.01)
*G06F 12/02* (2006.01)

(52) U.S. Cl.
CPC ........ *G06F 3/0673* (2013.01); *G06F 9/45558* (2013.01); *G06F 12/023* (2013.01); *G06F 12/1491* (2013.01); *G06F 21/53* (2013.01); *G06F 2221/033* (2013.01)

(56) References Cited

U.S. PATENT DOCUMENTS

| | | | |
|---|---|---|---|
| 10,534,739 B2* | 1/2020 | Villatel | G06F 21/78 |
| 2003/0140238 A1 | 7/2003 | Turkboylari | |
| 2006/0047959 A1* | 3/2006 | Morais | G06F 21/53 |
| | | | 713/193 |
| 2012/0159184 A1 | 6/2012 | Johnson et al. | |
| 2014/0245444 A1* | 8/2014 | Lutas | H04L 63/1441 |
| | | | 726/24 |
| 2016/0210069 A1* | 7/2016 | Lutas | G06F 3/0637 |
| 2017/0250817 A1 | 8/2017 | Bonzini et al. | |
| 2021/0303181 A1* | 9/2021 | Wang | G06F 3/0632 |
| 2021/0342092 A1* | 11/2021 | Wu | G06F 3/0673 |

* cited by examiner

APPARATUS AND METHOD FOR PROVIDING ONE TIME PROGRAMMABLE MEMORY FEATURES IN A HYPERVISOR OF A COMPUTING DEVICE

CROSS-REFERENCE TO RELATED APPLICATIONS

This application is a National Stage of International Application No. PCT/EP2018/071554, filed on Aug. 8, 2018, which is hereby incorporated by reference in its entirety.

TECHNICAL FIELD

The aspects of the present disclosure relate generally to computing apparatus and more particularly to management of computer memory in computing apparatus.

BACKGROUND

Modern computer applications typically need to allocate memory and store data within the computing apparatus on which they are hosted. User applications are typically supported by an operating system (OS) and need to request the OS to allocate various types of memory on their behalf. Data stored in certain types of memory often remains unchanged for long periods of time and may be of high importance to the security of the system. These data can become tempting targets for hackers and computer malware. Unauthorized modification can lead to system down time or loss of monetary value.

One approach to protecting data from unwanted modification is to use a type of computer memory configured to be written once and retain the written values constant thereafter where the constant values may be read at any time but not modified. This type of computer memory may be referred to as write once read many memory. The write once read many memory may be based on technologies such as efuse type computer memory. Writing to efuse memory involves permanently altering metal connections, referred to as fuses, to set the data. This guarantees through physical characteristics of the memory that once written, the data can never be changed. However, efuse memory can increase the cost of a computing apparatus and also has the disadvantage that the amount of efuse memory is fixed at manufacture time and cannot be easily or economically increased.

Many electronic products such as personal computers and smart phones store static high importance data in random access memory. An OS is then used to provide memory management services to protect the high importance data. Protecting data with an OS allows existing hardware and software resources to be used to ensure integrity and to protect the data from malicious attacks. There is a risk however, since an OS is large and complex it exposes a larger attack surface and thus poses a greater security risk than other software components. Once compromised, the data protected by the OS is also at risk.

Thus, there is a need for improved methods and apparatus that can reliably protect the integrity of high importance data stored within computer memory, while also providing the flexibility to easily change the amount of memory configured for write once read many operations which may be used for storing high importance data. Accordingly, it would be desirable to provide methods and apparatus that address at least some of the problems identified above.

SUMMARY

It is an object of the present disclosure to provide improved methods and apparatus that can provide one-time programmable memory functionality without the cost or other constraints typically associated with conventional hardware based write once read many memory.

According to a first aspect the above and further objects and advantages are obtained by an apparatus that includes a processor and a memory. The processor and the memory are configured to provide a first software process configured to execute at a first privilege level, and a second software process configured to execute at a second privilege level, wherein the first privilege level is more restrictive than the second privilege level. The processor is configured to initialize, at the first privilege level, a memory pool within the memory, and allocate, at the first privilege level, a block of memory. The processor is configured to send a request to write protect the block of memory to the second software process, and to write protect, at the second privilege level, the allocated block of memory. The write-protected block of memory provides all the functionality and security benefits of conventional write once read many memory, but in contrast the present apparatus can easily increase or decrease the amount of one-time programmable (OTP) memory without incurring the high costs and other disadvantages associated with hardware based write once read many memory.

In a first possible implementation form of the apparatus according to the first aspect, the processor is configured to receive within the first software process a memory allocation request, wherein the memory allocation request is sent by a software application. The software application sending the request is executing at the first privilege level or at a privilege level that is more restrictive than the first privilege level. This allows the first process to allocate and manage OTP memory for other applications executing within the apparatus.

In a possible implementation form of the apparatus according to the first aspect as such, the processor is configured to receive within the first process a request to write data to the allocated block of memory; and to write, at the first privilege level, the data to the allocated block of memory. This allows the application requesting allocation of OTP memory to initialize the OTP memory with a desired data.

In a possible implementation form of the apparatus according to the first aspect as such, the first software process comprises a kernel and the second software process comprises a hypervisor. The processor is configured to execute the kernel at the first privilege level and execute the hypervisor at the second privilege level. This provides a convenient means of easily implementing the novel OTP memory functionality disclosed herein to the software applications in a computing apparatus.

In a possible implementation form of the apparatus according to the first aspect as such, the first software process comprises a kernel and the second software process comprises a secure execution environment. The processor is configured to execute the kernel at the first privilege level and execute the secure execution environment at the second privilege level. This provides an alternative approach to implementing the novel OTP memory functionality in the software of a computing apparatus.

In a possible implementation form of the apparatus according to the first aspect as such, the apparatus comprises a mobile communication device. The OTP memory functionality is particularly useful when implemented in a mobile communication device such as a smart phone.

According to a second aspect the above and further objects and advantages are obtained by a method that includes executing a first software process at a first privilege level and a second software process at a second privilege level, wherein the first privilege level is more restrictive than the second privilege level. A memory pool is initialized at the first privilege level, and a block of memory is allocated at the first privilege level. The block of memory is write protected at the second privilege level. The write-protected block of memory provides al the functionality and security benefits of conventional write once read many memory, but in contrast apparatus can easily increase or decrease the amount of OTP memory without incurring the high costs and other disadvantages associated with hardware based OTP memory.

In a possible implementation form of the method according to the second aspect the method further comprises receiving within the first software process a memory allocation request from a third software process, wherein the third software process is executing at the first privilege level or at a privilege level that is more restrictive than the first privilege level. This allows the first process to provide OTP allocation services to other applications executing within the apparatus.

In a possible implementation form of the method according to the second aspect as such, the method further comprises receiving within the first software process a request to write data to the allocated block of memory, and writing, at the first privilege level, the data to the allocated block of memory. This allows the application requesting allocation of OTP memory to initialize the OTP memory with a desired data.

In a possible implementation form of the method according to the second aspect as such, wherein the first process comprises a kernel, and the second process comprises a hypervisor. This provides a convenient means of easily implementing the novel OTP memory functionality disclosed herein to the software applications in a computing apparatus.

In a fourth possible implementation form of the method according to the second aspect as such or to any of the first through third possible implementation forms of the second aspect, wherein the first software process comprises a kernel, and the second software process comprises a secure execution environment. This provides an alternative approach to implementing the novel OTP memory functionality in the software of a computing apparatus.

In a possible implementation form of the method according to the second aspect as such, the method is performed within a mobile communication device.

According to a third aspect the above and further objects and advantages are obtained by a non-transitory computer readable media having stored thereon program instructions that when executed by a processor cause the processor to perform the method according to the second aspect as such and the possible implementation forms.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed disclosure, for which reference should be made to the appended claims. Additional aspects and advantages of the disclosure will be set forth in the description that follows, and in part will be obvious from the description, or may be learned by practice of the disclosure. Moreover, the aspects and advantages of the disclosure may be realized and obtained by means of the instrumentalities and combinations particularly pointed out in the appended claims.

BRIEF DESCRIPTION OF THE DRAWINGS

In the following detailed portion of the present disclosure, the embodiments will be explained in more detail with reference to the drawings, in which.

DETAILED DESCRIPTION OF THE DISCLOSED EMBODIMENTS

Figure 1:
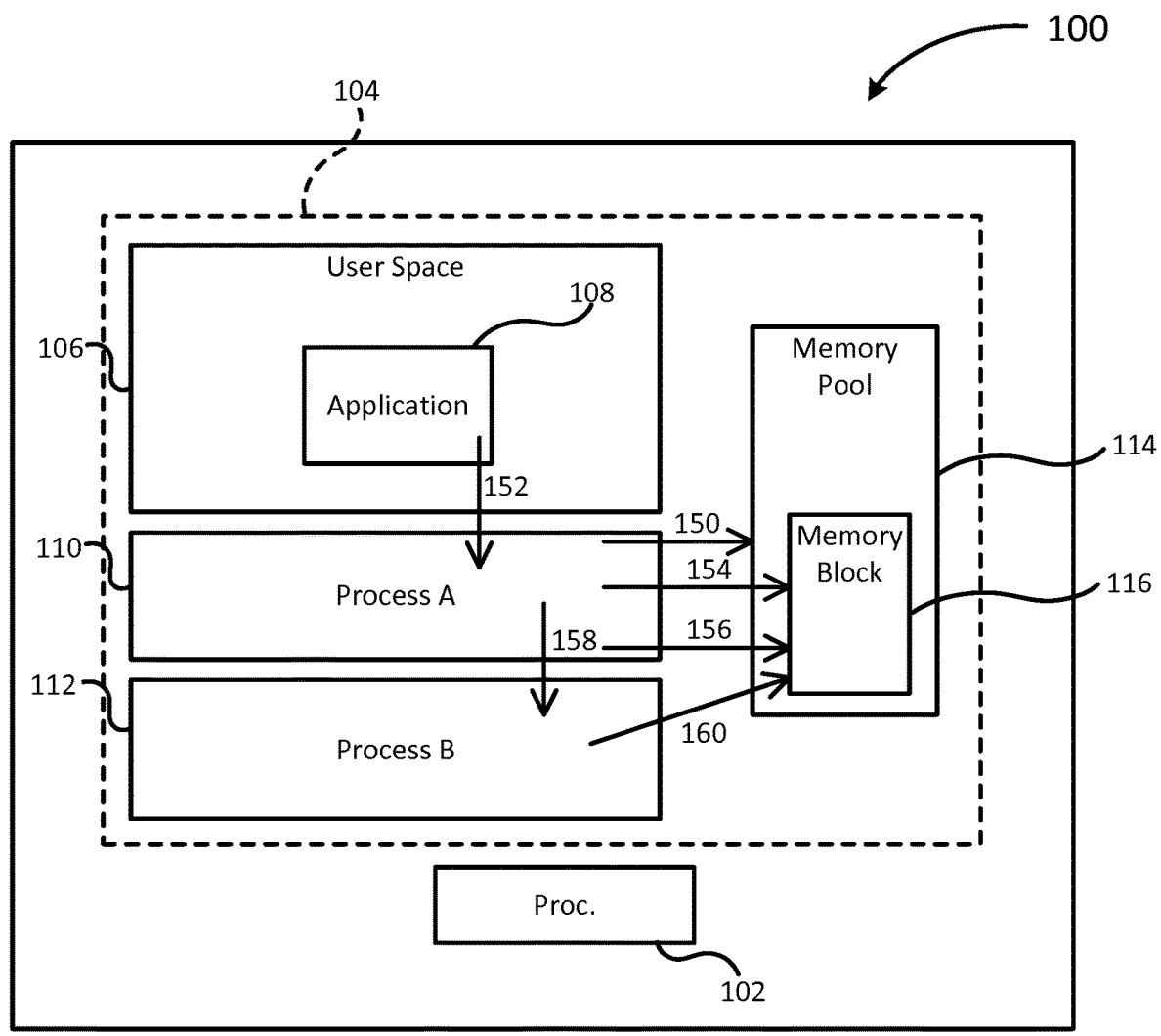
FIG. 1 illustrates a block diagram of an exemplary computing apparatus configured to provide one-time programmable memory functionality according to aspects of the disclosed embodiments.

FIG. 1 illustrates a block diagram of an exemplary computing apparatus 100 configured to provide one-time programmable memory functionality in a computing apparatus according to aspects of the disclosed embodiments. The computing apparatus 100 may be advantageously incorporated into various types of computing devices such as mobile phones, phablets, tablet computers, laptop computers, set top cable boxes, televisions, automobiles, etc., and can be advantageously employed to provide one-time programmable memory functionality within the computing apparatus 100. The computing apparatus 100 includes a processor 102 communicatively coupled to a computer memory (namely, memory 104). The processor 102 is configured to read and execute program instructions stored in the memory 104.

The processor 102 may be a single processing device or may comprise a plurality of processing devices including special purpose devices, such as for example, digital signal processing (DSP) devices, microprocessors, specialized processing devices, parallel processing cores, or general purpose computer processors. In certain embodiments, the processor 102 may include a central processing unit (CPU) working in tandem with a graphics processing unit (GPU) which may include a DSP or other specialized graphics processing hardware. The processor 102 is configured to read non-transient program instructions from the memory 104 and perform embodiments of the methods and processes disclosed herein.

The memory 104 may be any appropriate type of computer memory capable of storing and retrieving computer program instructions and/or data. The memory 104 may be a combination of various types of volatile and non-volatile computer memory such as for example read only memory (ROM), random access memory (RAM), magnetic or optical disk, or other types of computer operable memory capable of retaining computer program instructions and data.

The memory 104 is configured to store software program instructions or software programs along with any associated data as may be useful for the computing apparatus 100. The software programs stored in the memory 104 are organized into various software modules or components which may be referred to using terms based on the type or functionality provided by each software component. For example, the software components may include an operating system, a hypervisor, device or other hardware drivers, and/or various types of user applications such as a media player, an electronic mail application, a banking application, etc.

The software components may be executed separately or in combination by the processor 102 within collections of computing resources referred to as process spaces or processes 110, 112, 106. Each process, such as process A 110, process B 112 or the user space 106, is maintained separately by the processor 102 and includes a collection of computing resources. The collection of computing resources associated with a process space 106, 110, 112 are accessible to software programs executing within the process and may include resources such as a virtual memory space and/or hardware components. The processor 102 is configured to separate and when desired isolate each process space 106, 110, 112 from other process spaces such that programs executing in one process space may be prevented from accessing or modifying the computing resources associated with a different process space. As used herein the terms "process space" or "process" refer to the collection of computing resources accessible to one or more software programs executing within the process space.

To provide security and to prevent one process, such as the user space 106, from inadvertently or maliciously accessing or modifying the computing resources belonging to a different process, such as Process A 110, the processor 102 implements and enforces a system of privilege levels. A process that is executing at one privilege level is not allowed to view or access computing resources associated with a different process that is executing at the same privilege level or at a lower or more restrictive privilege level. A more restrictive privilege level is a privilege level that allows access to a smaller set of computing resources as compared to another privilege level. Conversely, a less restrictive privilege level is a privilege level that allows access to a larger set of computing resources as compared to another privilege level.

For example, a processor based on the Acorn RISK machine ARMv8-A architecture, referred to herein as the ARM architecture, provides 4 privilege levels also referred to as exception levels. Exception level zero (EL0), referred to as unprivileged execution, is the lowest privilege level, least privileged, and most restricted, while exception level three (EL3) is the highest privilege level, most privileged, and least restrictive. In computing apparatus based on the ARM architecture exception level 1 (EL1) is often used for execution of an operating system process, and exception level 2 (EL2) is configured to provide hypervisor support. A process executing at the lowest privilege level is allowed to access and modify computing resources associated with its own process but is not allowed to access or modify computing resources associated with any other processes executing on the computing apparatus 100. User space 106 applications 108 are typically executed at the lowest privilege level EL0, which is also the most restrictive privilege level.

In contrast a process executing at the next higher privilege level, such as EL1 in the ARM example presented above, is allowed to access and modify computing resources of processes executing at the lowest privilege level, EL0, but cannot access, view or modify computing resources of any process executing at the same or higher privilege level, such as EL2 or EL3. Thus the lowest privilege level EL0 is more restrictive than the privilege level EL1.

In the apparatus 100, the process B 112 executes at a privilege level that is higher and less restrictive than the privilege level of either the process A 110 or the user space processes 106. The process A 110 executes at a privilege level that is lower and more restrictive than the privilege level of the process B 112, and the privilege level of process A 110 is higher and less restrictive or the privilege level of the user space processes 106. The user space process 106 executes at a privilege level that is lower and more restrictive than the privilege levels of both the privilege level of process A 110 and the privilege level of process B 112. This allows the process A 110 to access and modify the computing resources of all applications 108 executing in a user space process 106, but prevents the process A 110 from accessing or modifying any computing resources associated with the process B 112.

In certain embodiments, the process A 110 may be an operating system configured to create and manage the user space process 106. In this embodiment the process A 110 executes at a privilege level that is higher than the user space process 106 thereby allowing the process A 110 to create access and destroy a user space process 106 while preventing any applications 108 that are executing within the user space process 106 from accessing or modifying any computing resources associated with the process A 110.

As an aid to understanding the techniques and systems disclosed herein, the exemplary computing apparatus 100 is illustrated using a single process at each privilege level: the user space process 106, process A 110, and process B 112. Those skilled in the art will readily recognize that the computing apparatus 100 may advantageously employ multiple processes at each privilege level or have additional processes executing at other privilege levels without straying from the spirit and scope of the present disclosure.

In one embodiment the process B 112 may be a hypervisor configured to create and manage a special type of process space referred to as a virtual machine. A virtual machine is a type of process space adapted to emulate a physical computer and a hypervisor is typically configured to execute multiple virtual machines on a single computing apparatus, such as the computing apparatus 100. The process B 112 executes at a higher privilege level than either the process A 110 or the user space process 106 thereby preventing either the user space process 106, such as a user application 108, or the process A 110, such as an operating system, from accessing or modifying computer resources reserved for the process B 112. This allows the hypervisor process B 112 to isolate the process A 110, such as an operating system, in a separate process space which prevents the process A 110 from accessing or modifying computer resources reserved for the process B 112.

User applications 108 executing in a user space process 106 are not allowed to access the memory management functionality necessary to allocate or otherwise control memory 104. Access to memory management functionality, such as hardware memory controllers, is reserved for higher privileged processes including process A 110 and process B 112. For example, in certain embodiments unprivileged processes such as the user space process 106, are provided with an abstraction of the memory 104, often referred to as virtual memory or virtual memory space, and are not able to access and in fact are not even aware of the physical memory devices that make up the memory 104. The user space processes 106 do not have information about how the virtual memory space relates to the physical computer memory 104. When a lower privileged process, such as the user space processes 106, requires memory management functions, such as memory allocation, initialization, etc., it must send a request to a higher privileged process such as process A 110, which in certain embodiments may include an operating system, to perform the desired memory operations on its behalf.

In operation the computing apparatus is adapted, as part of the system boot procedure, to have the process A 110 initialize 150 a portion of the memory 104 as a OTP memory pool 114 to be used as OTP memory. The OTP memory pool 114 is protected in a way that prevents the application 108 or any application executing in a lower privileged user process 106 from accessing or modifying any data stored in the OTP memory pool 114.

When the process A 110 receives a request 152 for OTP memory from a user application 108, a block of memory 116 is reserved 154 in the OTP memory pool 114. This block of memory 116 is made available for use by the user application 108. In certain embodiments it is desirable to populate or initialize 156 this memory block 116 with data that needs to remain constant and unchanged for extended periods of time.

The request 152 for OTP memory may be sent by a user application 116 that is executing at a priority that is lower or more restrictive than the priority of the process A 110. Alternatively, the request 152 for OTP memory may be received from any software process that is executing at a lower priority than the priority of the process A 110 or a process that is executing at the same priority as the process A 110. For example the request 152 for OTP memory may be sent by a software program that is executing within process A 110.

Because much or all of the data stored in the memory block 116 remains unchanged for extended periods of time it is a tempting target for access or modification by malicious software programs or hackers. To support the rich computing experience expected from user applications 108, the process A 110 typically includes a wide range of functionality such as that offered by a fully featured operating system kernel. Examples of a rich operating system kernel are those offered by operating systems (OS) such as the Android OS developed by GOOGLE™, iOS developed by APPLE™, or the widely distributed LINUX OS. Unfortunately, the rich feature set provided by an operating system kernel results in a large and somewhat complex software program having what is often determined to be an unacceptably large attack surface. The vulnerabilities of operating systems creates a security concern especially when data stored in the OTP memory block 116 includes sensitive confidential information, such as key material, account numbers, and access credentials.

To minimize risk of unauthorized access or modification of data in the memory block 116, a process B 112 executing at a higher privilege level than the process A 110 is used to place a write lock on the memory block 116. A request 158 to write protect the memory block 116 is sent to the process B 112 and in response, the process B 112 places 160 write protection on the memory block 116. The processor 102 is configured to reserve access to the memory management functionality that creates and removes the write lock to the higher privileged process B 112, thereby preventing the process A 110 and any user space processes 106 from modifying data stored in the memory block 116. The memory block 116 effectively becomes a one-time programmable memory from the perspective of the process A 110 and the application 108 executing in user space 106.

To maintain a high degree of security the process B 112 can include a smaller and less complex software program that exposes a significantly smaller attack surface than the program code executing in the process A 110. Because the software executing in process B 112 is more secure, the process B 112 can reliably maintain write protection on the OTP memory block 116.

As an aide to understanding it is instructive to consider an embodiment of the computing apparatus 100 where the process A 110 is an operating system kernel and the process B 112 is a hypervisor. It should be understood that the exemplary embodiment including an OS or kernel and a hypervisor are presented in the following description as an aide to understanding only and the embodiments and processes disclosed herein are not so limited and may be advantageously employed with any type of software programs executing in the process A 110 and the process B 112.

An OS is a type or category of software program designed to abstract the underlying computer resources and provide services to ensure applications are running properly. Any suitable software program, such as a Linux™ OS, Windows™ OS, Android™, iOS, or other operating systems or applications framework, are appropriate for use as kernel or OS kernel. An OS may be implemented as a single software program or it may be implemented with a central application to handle the basic abstraction and services with a collection of additional utilities and extensions to provide a larger set of functionalities. As used herein the term kernel or OS kernel refer to the central application portion of an operating system.

The kernel executing in process A 110 is configured to execute at an intermediate privilege level and to manage the lifecycle of, and allocate resources for, the user space process 106. The kernel executing in process A 110 may be configured to execute a plurality of user space processes 106 each having multiple applications 108. The intermediate privilege level used to execute the kernel 110 is higher than the privilege level used to execute the user space processes 106 thereby allowing the kernel process A 110 to load and/or start applications 108 in a user space process 106, while preventing any applications 108 executing in a user space process 106 form accessing of corrupting the kernel process A 110. The intermediate privilege level used to execute the kernel in process A 110 is lower than the process B 112 thereby preventing the OS kernel form accessing or modifying computer resources and memory functionality reserved to the process B 112.

In addition to presenting a relatively large attack surface, the size and complexity of an OS or OS kernel often necessitates regular software updates. These updates may come from multiple sources and may affect many different functionalities of the OS. Thus updating an OS further increases the risk of corruption or injection of malware into the OS.

A hypervisor is a relatively small software component designed to run one or more virtual machines (VM) on a single hardware computing platform, such as the computing apparatus 100. The small size and stability of a hypervisor allows the hypervisor to be stored in a non-volatile memory area as firmware and be executed in a process B 112 at a high privilege level in a dedicated portion of the memory 104. Because the process B 112 is executed at a privilege level that is higher than the process A 110 or the user process 106, the hypervisor executing in process B 112, is completely hidden from both the kernel process A 110 and the user space process 106 so that neither the kernel process A 110 nor the user space process 106 are aware of the existence of the hypervisor in process B 112. This allows the hypervisor to hide much of the computing resources and physical hardware included in the computing apparatus 100 and to hide much of the memory management functionality from the kernel that is executing in process A 110 and applications 108 executing in the user process 106, thereby reserving management and protection of the memory 104 to the hypervisor.

The hypervisor executing in process B 112 guarantees integrity of data stored in the memory block 116 by providing additional access control beyond what is provided by the kernel executing in process A 110. Thus, the process B 112 can provide similar services and functionality equivalent to hardware based OTP memory without the increased cost and size limitations associated with hardware based OTP memory solutions.

During operation of the computing apparatus 100 circumstances may arise where the entire OTP memory pool 114 has been allocated to write protected memory blocks 116. In conventional computing systems, where the write once read many memory pool is composed of hardware based memory, it is difficult, costly, and often impractical to increase the size of the write once read many memory pool. In contrast, the computing apparatus 100 may be configured to have the highly privileged process B 112 allocate additional memory 104, such as RAM memory, for the OTP memory pool 114 and protect it from access by either the process A 110 or the user process 106, thereby allowing the size of the OTP memory pool 114 to be increased, or decreased, dynamically as needed without any significant impact on performance or cost of the computing apparatus 100.

Figure 2:
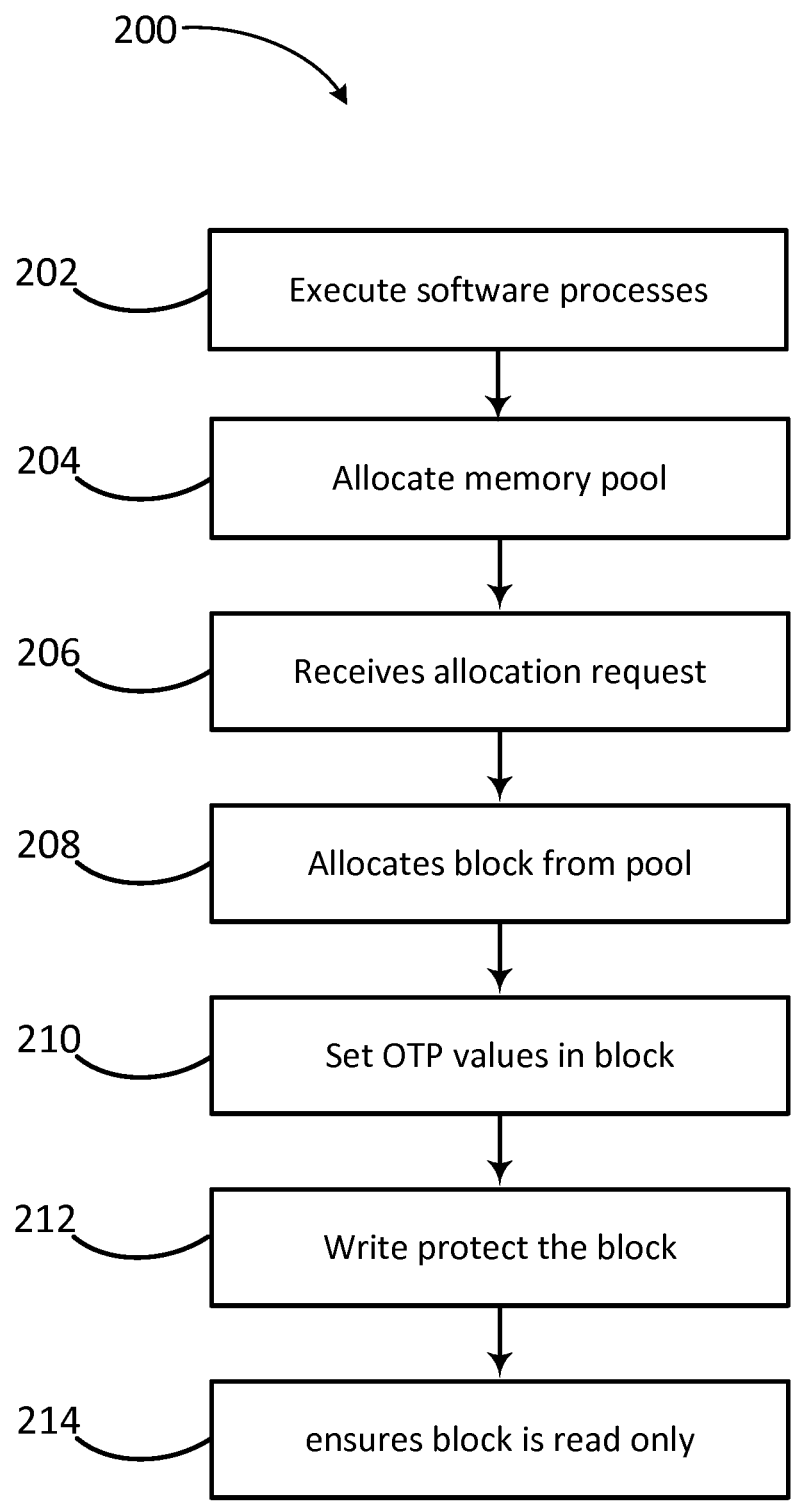
FIG. 2 illustrates a software flow diagram of an exemplary method for providing one-time programmable memory functionality in a computing apparatus in accordance with aspects of the disclosed embodiments.

FIG. 2 illustrates a software flow diagram of an exemplary method 200 for providing one-time programmable memory functionality in a computing apparatus in accordance with aspects of the disclosed embodiments. The exemplary method 200 is appropriate for use in a computing apparatus and provides secure OTP memory functionality without the cost and size limitations associated with hardware based OTP memory solutions.

At 202, a first process is executed at a first priority and a second process is executed at a second priority. The first priority is lower and more restrictive than the second priority. A process executing at a more restrictive priority has access to fewer computing resources as compared to a less restrictive, thus since the first software priority is more restrictive than the second priority, the first process has access to fewer computing resources than the second process.

For example, the second process may have access to the portion of a memory controller used to place and remove write protections on portions of the computer's memory. The first process, having a more restrictive priority, may not have access to the write protection capabilities of the memory controller. Thus, the second process would be able to write protect a portion of the memory and the first process would not be able to remove the write protections.

At 204, a memory pool is then allocated or initialized for use as an OTP memory pool. Initializing of the memory pool includes allocating or setting aside a portion of memory for use as OTP memory and when desired setting an initial value into each location in the memory pool. In certain embodiments it may be desirable to allocate the memory pool in the physical memory of the computing apparatus and use the hardware based memory controller functionality to reserve this memory for use as an OTP memory pool.

At 206, during operation the first process receives a request to allocate OTP memory within the memory pool. This request may originate from user applications or from within the first software process itself. The process sending the request for OTP memory should be executing at a privilege level that is the same as or lower and more restrictive than the priority of the first process. For example, the request may originate from a user application that is executing at a lower privilege level that does not allow any memory allocation or write protection operations, and therefore would be considered a more restrictive priority as compared to the first priority or the second priority.

At 208, the first process then allocates, at the first priority, a block of memory from the memory pool. At 210, the data or OTP values are then written to or set in the allocated block of memory. These values may be provided by the application that requested allocation of the OPT memory block or they may be obtained or determined through other means.

Once the values or data contained in the OTP memory block have been set to the desired values, at 212, the memory block is write protected at the second priority level. Because the write protection was applied by the second process that is executing at the second privilege level, any process, such as the first process or any user applications will be prevented from modifying any values within the OTP memory block. As discussed above, the ability to write protect or remove write protections from the memory block is protected by the system of priorities in a way that allows the second process executing at the second priority level to apply write protection of the memory block but prevents any lower priority process, such as the first process executing at the first privilege level or any user applications executing at a lower or more restrictive privilege level, from removing the write protection or modifying values stored in the OTP memory block.

At 214, the write protection is enforced by the computing apparatus to ensure that the OTP memory block remains read only and that the values are not changed. This write protection is configured to remain in force until the computing apparatus is rebooted and/or any software processes executing on the computing apparatus are restarted.

In certain embodiments the first software process may be an operating system kernel such as the OS kernel described above, and the second process may be a hypervisor type software application, such as a firmware based hypervisor. Since the hypervisor is a smaller, more secure and stable software application than the OS kernel, it presents a smaller attack surface and may be considered more secure or more trusted. This allows the hypervisor to write protect the OTP memory block and prevent the OS kernel from modifying any data stored in the OTP memory block.

As used herein the term priority is expanded to cover differing process states or execution environments. Certain computing apparatus are configured to provide multiple execution environments. For example the computing apparatus may include a trusted execution environment (TEE) or a secure execution environment (SEE) along with a normal world execution environment also referred to as a rich execution environment (REE). The SEE is a highly secure execution environment that uses hardware based security to protect data and programs stored in the SEE from being accessed from the REE. All communication between the SEE and the REE is tightly controlled through functionality built into the processor and memory of the computing apparatus. The result of this is that software and data protected within the SEE may not be access or tampered with by programs executing in the REE. As used herein the term higher priority is used to describe a SEE and the normal world execution environment, or REE, is referred to as having a more restrictive priority than the SEE.

In certain embodiments, the first process that services requests for OTP memory is an application such as an OS kernel that is executing in the REE, and the second process is a software program executing within and protected by the SEE. Write protecting the OTP memory block can then be done within the SEE environment thereby preventing any applications, such as the first process, that are executing in the REE from updating or modifying in any way the OTP memory block.

Thus, while there have been shown, described and pointed out, fundamental novel features of the disclosure as applied to the exemplary embodiments thereof, it will be understood that various omissions, substitutions and changes in the form and details of apparatus and methods illustrated, and in their operation, may be made by those skilled in the art without departing from the spirit and scope of the presently disclosed disclosure. Further, it is expressly intended that all combinations of those elements, which perform substantially the same function in substantially the same way to achieve the same results, are within the scope of the disclosure. Moreover, it should be recognized that structures and/or elements shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. An electronic device, comprising:
   a non-transitory memory comprising instructions; and
   a processor coupled to the non-transitory memory, the instructions being executed by the processor to cause the electronic device to:
   provide a first software process configured to execute at a first privilege level;
   provide a second software process configured to execute at a second privilege level, wherein the first privilege level is more restrictive than the second privilege level;
   initialize, at the first privilege level, a memory pool within the memory;
   allocate, at the first privilege level, a block of memory from the memory pool;
   write, at the first privilege level, data to the allocated block of memory;
   send a request to write protect the allocated block of memory to the second software process; and
   write protect, at the second privilege level, the allocated block of memory to configure the allocated block of memory as a one-time programmable (OTP) memory that is read-only for any process at the first privilege level until the electronic device is rebooted.

2. The electronic device of claim 1, the instructions further cause the electronic device to:
   receive within the first software process a memory allocation request, wherein the memory allocation request is sent by a software application, and wherein the software application is executing at the first privilege level or at a privilege level that is more restrictive than the first privilege level.

3. The electronic device of claim 1, the instructions further cause the electronic device to:
   receive within the first software process a request to write the data to the allocated block of memory.

4. The electronic device of claim 1, wherein the first software process comprises a kernel, the second software process comprises a hypervisor, and the instructions further cause the electronic device to:
   execute the kernel at the first privilege level and execute the hypervisor at the second privilege level.

5. The electronic device of claim 1, wherein the first software process comprises a kernel, the second software process comprises a secure execution environment, and the instructions further cause the electronic device to:
   execute the kernel at the first privilege level and execute the secure execution environment at the second privilege level.

6. The electronic device of claim 1, wherein the electronic device comprises a mobile communication device.

7. A method comprising:
   executing a first software process at a first privilege level and a second software process at a second privilege level;
   initializing, at the first privilege level, a memory pool;
   allocating, at the first privilege level, a block of memory from the memory pool;
   write, at the first privilege level, data to the allocated block of memory; and
   write protecting, at the second privilege level, the allocated block of memory to configure the allocated block of memory as a one-time programmable (OTP) memory that is read-only for any process at the first privilege level until the electronic device is rebooted, wherein the first privilege level is more restrictive than the second privilege level.

8. The method of claim 7, wherein the method further comprises:
   receiving within the first software process a memory allocation request from a third software process, wherein the third software process is executing at the first privilege level or at a privilege level that is more restrictive than the first privilege level.

9. The method of claim 7, wherein the method further comprises:
   receiving within the first software process a request to write the data to the allocated block of memory.

10. The method of claim 7, wherein the first process comprises a kernel, and the second process comprises a hypervisor.

11. The method of claim 7, wherein the first software process comprises a kernel, and the second software process comprises a secure execution environment.

12. The method of claim 7, wherein the method is performed within a mobile communication device.

13. A computer program product, the computer program product being embodied in a non-transitory computer readable medium and comprising computer instructions for:
   executing a first software process at a first privilege level and a second software process at a second privilege level;
   initializing, at the first privilege level, a memory pool;
   allocating, at the first privilege level, a block of memory from the memory pool;
   writing, at the first privilege level, data to the allocated block of memory; and
   write protecting, at the second privilege level, the allocated block of memory to configure the allocated block of memory as a one-time programmable (OTP) memory that is read-only for any process at the first privilege level until the electronic device is rebooted, wherein the first privilege level is more restrictive than the second privilege level.

14. The computer program product of claim 13, the computer program product further comprises computer instructions for:
   receiving within the first software process a memory allocation request from a third software process, wherein the third software process is executing at the first privilege level or at a privilege level that is more restrictive than the first privilege level.

15. The computer program product of claim 13, the computer program product further comprises computer instructions for:

receiving within the first software process a request to write the data to the allocated block of memory.

16. The computer program product of claim 13, wherein the first process comprises a kernel, and the second process comprises a hypervisor.

17. The computer program product of claim 13, wherein the first software process comprises a kernel, and the second software process comprises a secure execution environment.

18. The computer program product of claim 14, wherein the first process comprises a kernel, and the second process comprises a hypervisor.

\* \* \* \* \*